US009500522B2

United States Patent
Mechtel et al.

(10) Patent No.: US 9,500,522 B2
(45) Date of Patent: Nov. 22, 2016

(54) APPARATUS AND METHOD FOR DETECTION OF ELECTROMAGNETIC RADIATION USING OPTICAL SWITCHES IN AN RF NETWORK

(71) Applicants: Deborah Mechtel, Clarksville, MD (US); Brian Jenkins, Crofton, MD (US); Peter Joyce, Annapolis, MD (US); Samara Firebaugh, Annapolis, MD (US); Adam Goetz, Olathe, KS (US)

(72) Inventors: Deborah Mechtel, Clarksville, MD (US); Brian Jenkins, Crofton, MD (US); Peter Joyce, Annapolis, MD (US); Samara Firebaugh, Annapolis, MD (US); Adam Goetz, Olathe, KS (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/735,401

(22) Filed: Jun. 10, 2015

(65) Prior Publication Data
US 2015/0362364 A1 Dec. 17, 2015

Related U.S. Application Data

(60) Provisional application No. 62/010,584, filed on Jun. 11, 2014.

(51) Int. Cl.
*G01J 1/42* (2006.01)
*G01D 5/252* (2006.01)
*G01J 9/00* (2006.01)

(52) U.S. Cl.
CPC .............. *G01J 1/4228* (2013.01); *G01D 5/252* (2013.01); *G01J 9/00* (2013.01)

(58) Field of Classification Search
CPC ........ G01J 1/4228; G01J 9/00; G01D 5/252; G02B 6/3596
See application file for complete search history.

(56) References Cited

U.S. PATENT DOCUMENTS 6,501,869 B1 * 12/2002 Athale ................. G02B 6/3596
385/17
2010/0052083 A1 * 3/2010 Kasai .................. H01L 31/0352
257/431

* cited by examiner

*Primary Examiner* — Leon Flores
(74) *Attorney, Agent, or Firm* — US Naval Research Laboratory; Joslyn Barritt (57) ABSTRACT

Apparatuses and methods for identifying and characterizing an impingement by electromagnetic radiation on a structure's surface. An array of input and output radiofrequency transmission lines are connected by photoconductive switches that conduct only when exposed to incident electromagnetic radiation. Each input line is assigned a unique input RF frequency. If a switch is exposed to radiation, the connection between the corresponding input and output lines closes, and an RF signal is output from the output port connected to the closed switch, while if the switch is not exposed to the incident radiation, the connection remains open and no RF signal is output. By analyzing the frequencies of the signals output at a port, the location of the radiation incident on the structure can be determined.

18 Claims, 8 Drawing Sheets

APPARATUS AND METHOD FOR DETECTION OF ELECTROMAGNETIC RADIATION USING OPTICAL SWITCHES IN AN RF NETWORK

CROSS-REFERENCE

This Application is a non-provisional of and claims the benefit of priority under 35 U.S.C. §1.119 based on U.S. Provisional Patent Application No. 62/010,584 filed on Jun. 11, 2014, the entirety of which is incorporated into the present disclosure.

BACKGROUND

Human skin is a remarkable organ. It can perceive a touch, and can immediately identify where on the body that the touch occurs, as well as other information such as the intensity and nature of the touch, e.g., whether it is hot or cold, soft or hard, or blunt or sharp.

The outer surface of structures such as buildings and vehicles are also subject to "touches," particularly from electromagnetic (EM) radiation such as a laser impinging on the surface of the structure, and it would be desirable if it were possible to identify whether such an outer surface has been touched by radiation and where that touch occurs, as well as to be able to determine other characteristics of the touch such as the intensity of the radiation or its wavelength.

One example of a structure that would benefit greatly from being able to detect such laser radiation touches are aircraft.

Current aircraft cockpits are not outfitted with a method for detecting incident laser radiation. The method in place for using optical sensors for collision avoidance uses either a hand held or mounted apparatus similar to lidar. The apparatus sends out a signal and then detects the reflected returned signal In contrast, the proposed invention is an integral part of a vehicle and is intended to sense and respond to incident laser light location and intensity in real time and thereby use that information to adjust the vehicle trajectory. Current manned and robotic vehicles outfitted with optical sensors do not use the proposed approach.

Thus, there is a need for a simple, scalable apparatus and method for identifying and characterizing an electromagnetic radiation "touch" to a structure.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides apparatuses and methods for identifying and characterizing an impingement by electromagnetic radiation on a structure's surface.

In a first embodiment in accordance with the present invention, an apparatus is provided comprising a three-dimensional 2×n×m array consisting of n input radiofrequency transmission lines situated in a first layer and an array of m signal output lines situated in a separate layer, where the direction of at least some of the input lines intersects the direction of at least some of the output lines. Each pair of intersecting input and output lines is physically connected by means of a connector formed from a photoconductive material that conducts only when it is illuminated by electromagnetic radiation. If the photoconductive connectors are not illuminated by any electromagnetic radiation, the connection between the input and output transmission lines remains open and no RF signal is received at the output ports. If one or more of the photoconductive connectors is illuminated by electromagnetic radiation, the connection between the input and output transmission lines made by the illuminated connector(s) closes and an RF signal is received at the output ports connected to the closed photoconductive connector.

In a second embodiment in accordance with the present invention, an apparatus is provided comprising a two-dimensional n×m array of intersecting input and output radiofrequency transmission lines, where both the n input transmission lines and the m output transmission lines lie within a single plane and are connected by photodetecting connectors which modify the output of any given line when they are exposed to electromagnetic radiation.

In some embodiments, the connectors can be made from multiple different materials that are photosensitive to different wavelengths so that the apparatus can identify the wavelength of the radiation that is illuminating the structure.

The output signals can be fed into a processor for further analysis and processing, e.g., to produce a "map" of the structure surface that provides information regarding the electromagnetic impingement on the structure.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The purpose of the invention is to detect electromagnetic radiation directed at a structure. Detection is accomplished using optical sensors embedded in the structure, where the sensors act as switches for a radio frequency (RF) network comprising one or more layers of RF transmission lines.

One example of an optical sensor that can be used in an apparatus for detecting electromagnetic radiation using an RF network in accordance with the present invention is a photoconductive detector.

Photoconductors are made of semiconductor materials that are optically sensitive at material-dependent wavelengths. When radiation having an appropriate wavelength is incident on the material, electron-hole pairs are generated in the material, so that the semi-insulating photoconductor becomes a conductor. For example, the resistivity of phosphorous doped silicon rapidly changes from >6000 ohm-cm to <0.4 ohm-cm when illuminated. When contacted at both ends, e.g., with an ohmic contact such as a conductive epoxy, the photoconductive material becomes an optical switch that controls the transmission of a signal through a transmission line.

Figure 1A:
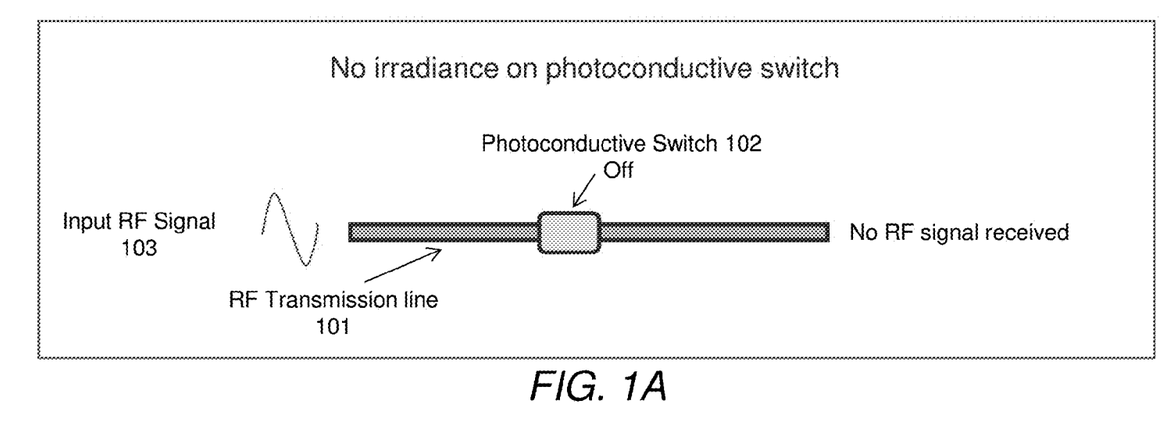
FIGS. 1A and 1B are block drawings illustrating aspects of a photoconductive switch used in an apparatus and method for detecting electromagnetic radiation using optical switches in an RF network in accordance with the present invention.
Figure 1B:
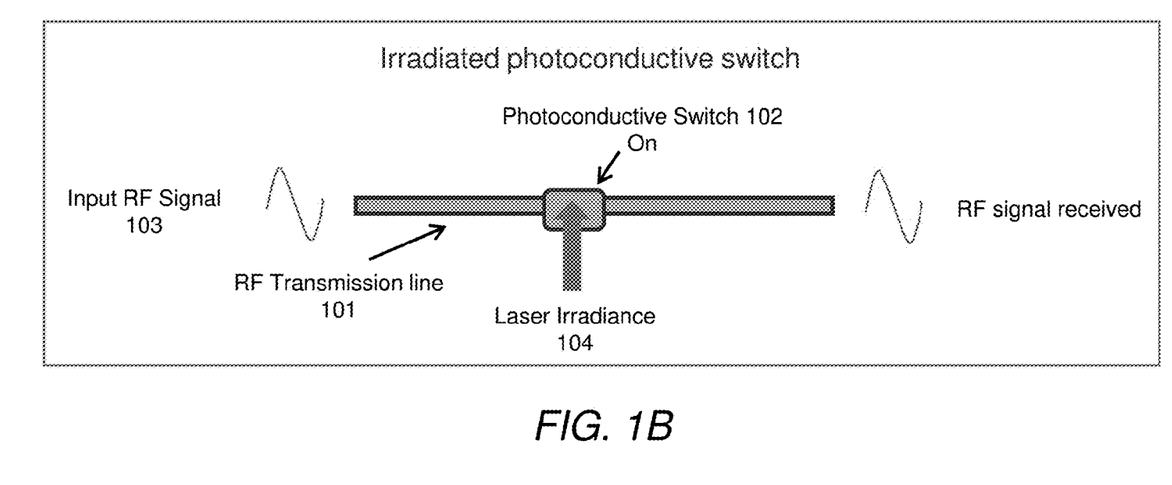

FIGS. 1A and 1B illustrate the operation of such a photoconductive optical switch. As illustrated in FIGS. 1A and 1B, an RF transmission line 101 can be controlled by a photoconductive switch 102 that is contacted at both ends to the transmission line. An RF signal 103 is input into the transmission line at one end. As shown in FIG. 1A, in the absence of any irradiance on switch 102, switch 102 is "off", and no output RF signal is received at the other end of the transmission line. However, as shown in FIG. 1B, if photoconductive switch 102 is illuminated by electromagnetic radiation having sufficient energy, e.g., by laser irradiance 104, switch 102 is "on," allowing input RF signal 103 to travel through transmission line 101 so that an RF signal is received at the other end.

As described in more detail below, in accordance with the present invention, such photoconductive optical switches are embedded in GHz range RF transmission lines to permit signal propagation only when the photoconductive material is illuminated. By measuring the signal output at each output port, the position and intensity of incident electromagnetic radiation on a structure can be determined. By fabricating the photoconductive optical switches from materials that are sensitive to specific wavelengths, the apparatus can be tuned to be sensitive to a particular type of electromagnetic radiation. In addition, in some embodiments, different photoconductive optical switches can be fabricated from different materials having different wavelength sensitivities so that the type of radiation incident at a particular location can be identified.

In other cases, photosensitive materials can be used as electrical connectors which do not have a strict "on-off" operation, but instead modify the RF output, e.g., by altering its magnitude and/or phase, depending on whether or not they are exposed to electromagnetic radiation.

Figure 2A:
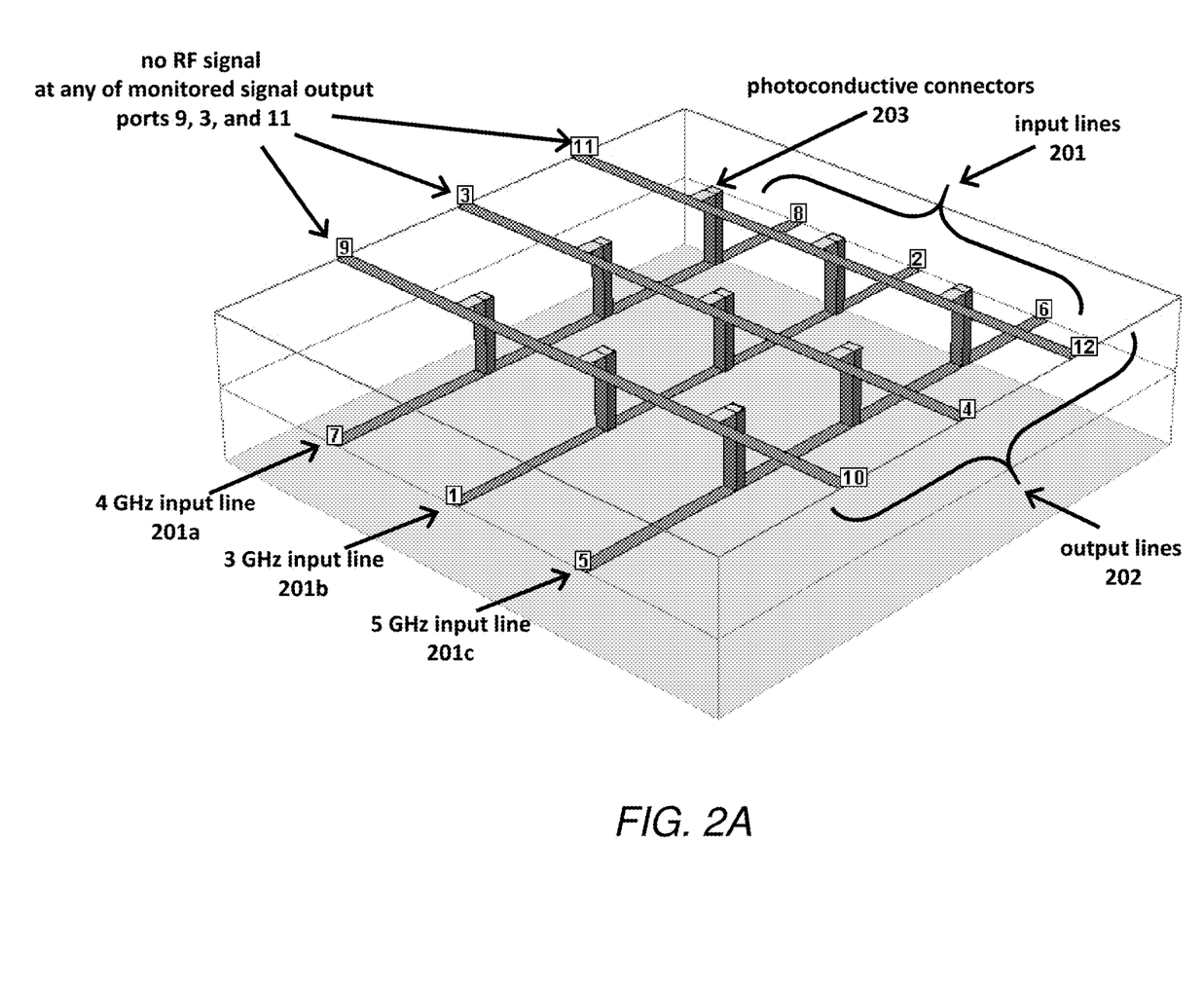
FIGS. 2A and 2B are block drawings illustrating an exemplary embodiment of a three-dimensional configuration of an apparatus for detecting electromagnetic radiation using photoconductive optical switches in an RF network in accordance with the present invention.

The block diagrams in FIGS. 2A/2B and 3A/3B illustrate aspects of two exemplary embodiments of an apparatus for detecting electromagnetic radiation using optical switches in a radiofrequency network in accordance with the present invention.

Figure 2B:
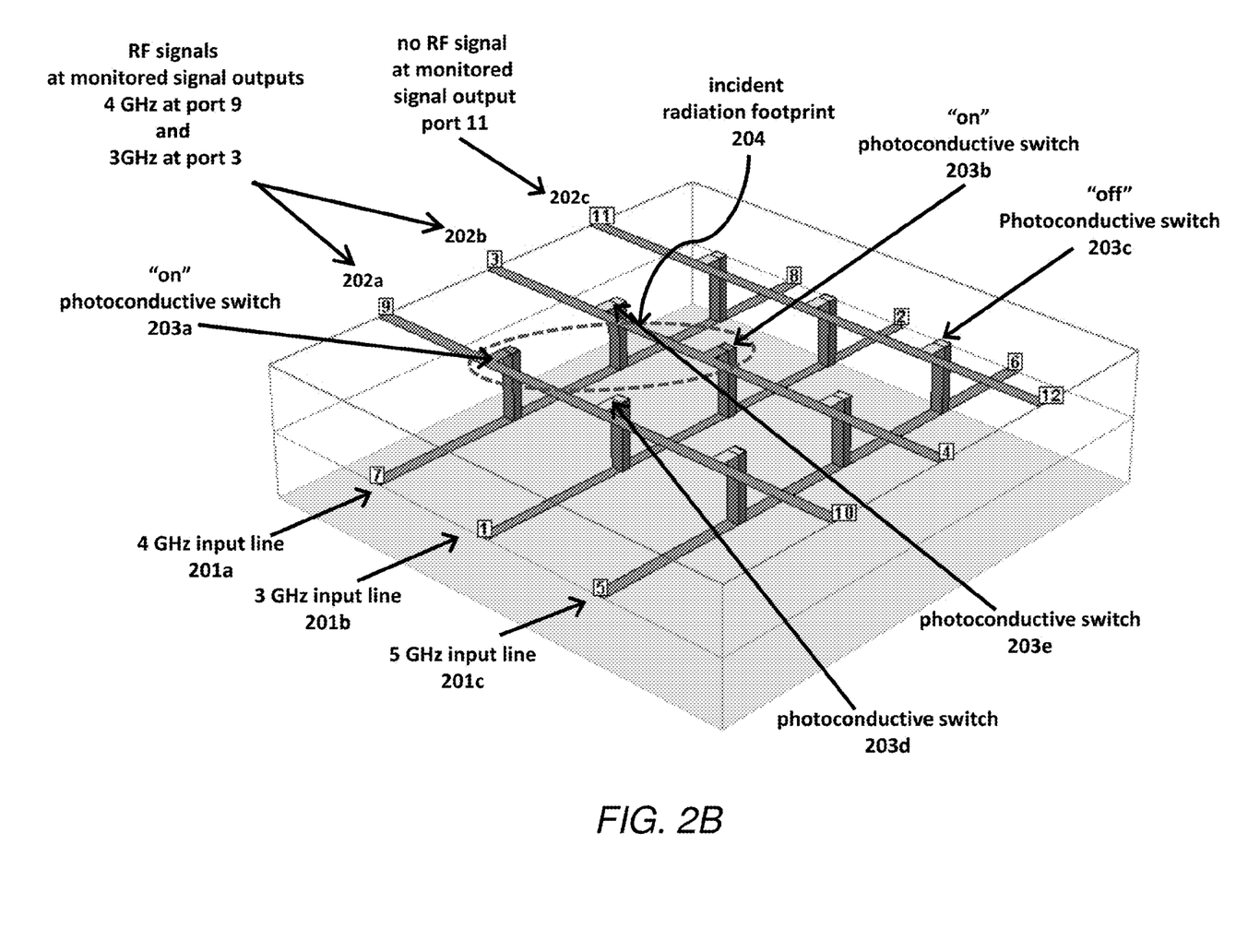

Thus, as illustrated in FIGS. 2A and 2B, a first exemplary embodiment of an apparatus for detecting electromagnetic radiation using optical switches in a radiofrequency network in accordance with the present invention comprises a three-dimensional two-layer 2×n×m array of RF transmission lines comprising n input transmission lines 201, each being assigned a unique frequency $f_n$ and terminating in a corresponding plurality of input ports, arranged in a first layer of the structure, and m output transmission lines 202 terminating in a corresponding in a corresponding plurality of output ports arranged in a second layer. The input and output lines lie in separate planes, with the direction of each input line crossing the direction of at least one output line.

The input and output lines are physically connected to each other by a corresponding plurality of photoconductive switches 203. As described in more detail below, when activated by exposure to electromagnetic radiation incident thereon, the photoconductive switches provide a conductive path between the input and output transmission lines and selectively route RF signals from the input transmission lines 201 to the output transmission lines 202.

It should be noted that in the embodiment shown in FIGS. 2A and 2B, the input transmission lines 201 lie in a lower plane and the output transmission lines 202 lie in an upper plane above the input transmission lines 201, but one skilled in the art will readily recognize that this is not required, and the location of the input and output transmission lines can be reversed so that the output transmission lines 202 are located below the input lines 201. In addition, it should be noted that although the input and output lines are shown as being orthogonal in FIGS. 2A and 2B, orthogonality is not required, and the directions of the lines can cross at any suitable angle so long as each input transmission line 201 crosses at least one output transmission line 202.

As illustrated in FIG. 2A, when the structure is not illuminated by electromagnetic radiation, the photoconductive switches 203 remain in their "off" state so that input and output lines 201/202 remain unconnected, and no RF signal is received at any of output ports 9, 3, or 11 shown in the FIGURE.

However, as illustrated in FIG. 2B, when a portion of the structure is illuminated by electromagnetic radiation incident on the structure, the photoconductive switches located within the footprint of the incident radiation on the structure become active so that an electrical connection between the input and output lines is made. Thus, as shown in FIG. 2B, photoconductive switch 203a, which connects input line 201a and output line 202a, and photoconductive switch 203b, which connects input line 201b and output line 202b, lie within the incident radiation footprint 204. As a result, those switches are "on," and RF signals are routed to output ports 9 and 3 via those active switches. In contrast, the photoconductive switches in the array that lie outside the radiation footprint are not illuminated by the incident radiation and remain in their nonconductive "off" state, so that no connection between their corresponding input and output lines is made. For example, photoconductive switch 203c lies outside incident radiation footprint 204, and so no connection is made between input line 201c and output line 202c and no RF signal is received at output port 11 via that switch.

Each input line inputs an RF signal having a unique frequency. For example, as shown in FIGS. 2A and 2B, input transmission line 201a at input port 7 inputs an RF transmission having a frequency of 4 GHz, line 201b at input port 1 inputs an RF transmission having a frequency of 3 GHz, and input line 201c at input port 5 inputs an RF transmission having a frequency of 5 GHz. Because each input line 201a/201b/201c has been assigned a unique frequency, the output measured at the output ports connected to the active switches will reflect the input frequency. Thus, an output having a frequency of 4 GHz is measured at port 9, which is connected to input line 201a by means of "on" photoconductive switch 203a, and an output having a frequency of 3

GHz is measured at port 3, which is connected to input line 201b by means of "on" photoconductive switch 203b. By determining the frequency of the output at a given output port, the position of the incident radiation on the grid can be located by identifying the location of the photoconductive switch lying at the intersection of the appropriate input and output lines. Thus, detection of a 3 GHz signal at port 3 and not at port 9 or port 11 indicates the location of the active switch that has been exposed to the radiation.

If the radiation footprint is large enough to cover more than one switch for a given output line, e.g., to also cover photoconductive switch 203d between input line 201b and output line 202a such that photoconductive switch 203d is "on", the signal output at port 9 would contain both a 4 GHz component from input line 201a and a 3 GHz component from input line 201b, and signal processing methods well known in the art can easily detect the presence of such multiple frequencies at the same output port. Alternatively, if the footprint is large enough to cover more than one connector for a single input line, e.g., to also cover photoconductive switch 203e between input line 201a and output line 202b, the 4 GHz signal from line 201a will be detected at port 3 as well as at port 9. Detection of multiple frequencies at one output port—or of the same frequency at multiple ports—will provide information regarding the size and location of the radiation footprint on the structure.

In addition, as noted above, in some embodiments, by fabricating the photoconductive switches from material that is sensitive to particular wavelengths, an apparatus in accordance with the present invention can be tuned to detect specific types of radiation that may be of particular interest, such as ultraviolet radiation, near and far infrared radiation, or visible light, while in other embodiments, the apparatus can include a plurality of photoconductive switches sensitive to different wavelengths, so that pinpointing the location of the activated switch can also provide information regarding the type of radiation impinging on the structure without the need for the structure to be tuned to detect to any particular wavelength.

Figure 3A:
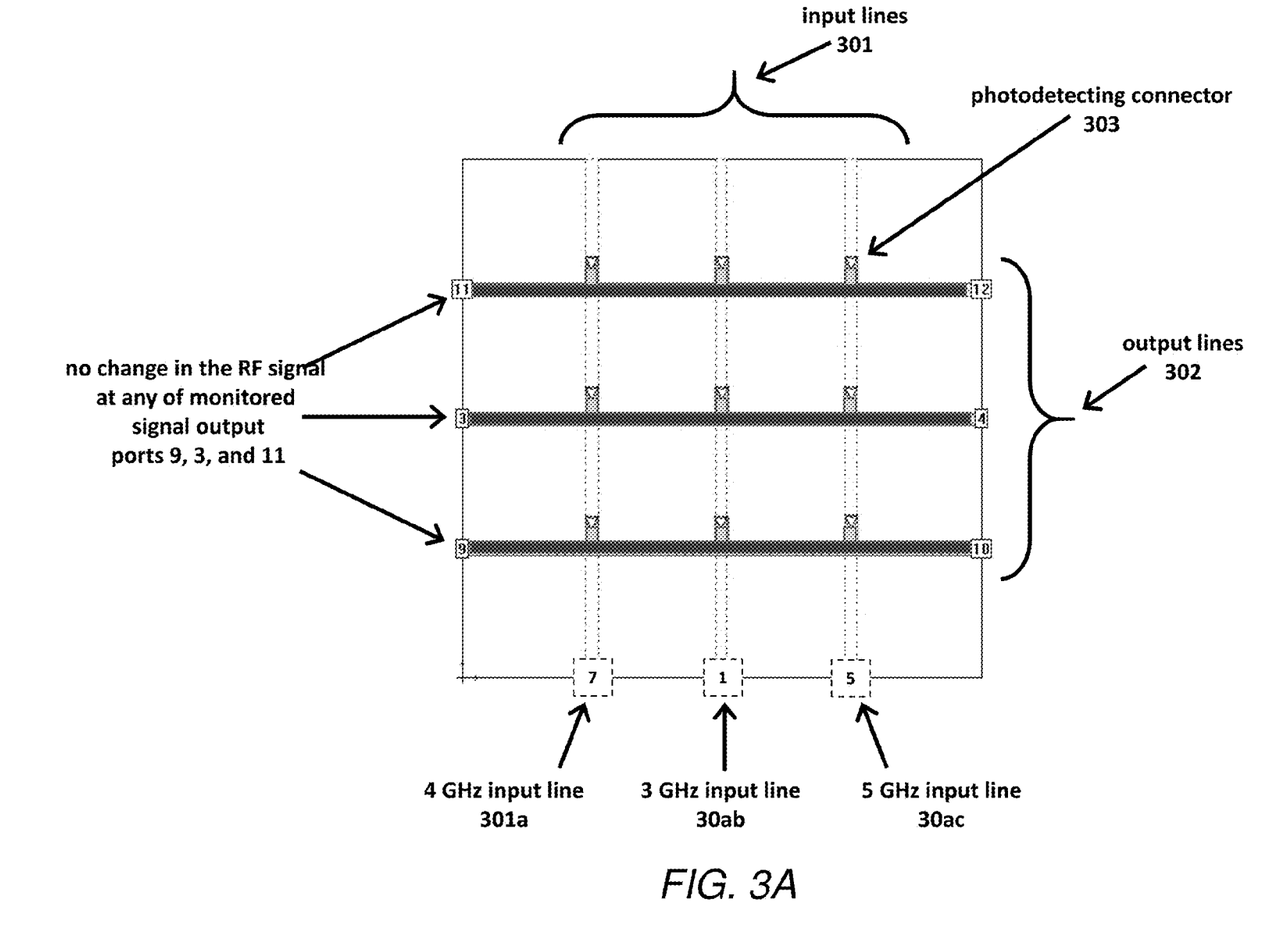
FIGS. 3A and 3B are block drawings illustrating an exemplary embodiment of a two-dimensional configuration of an apparatus for detecting electromagnetic radiation using photodetecting connectors in an RF network in accordance with the present invention.
Figure 3B:
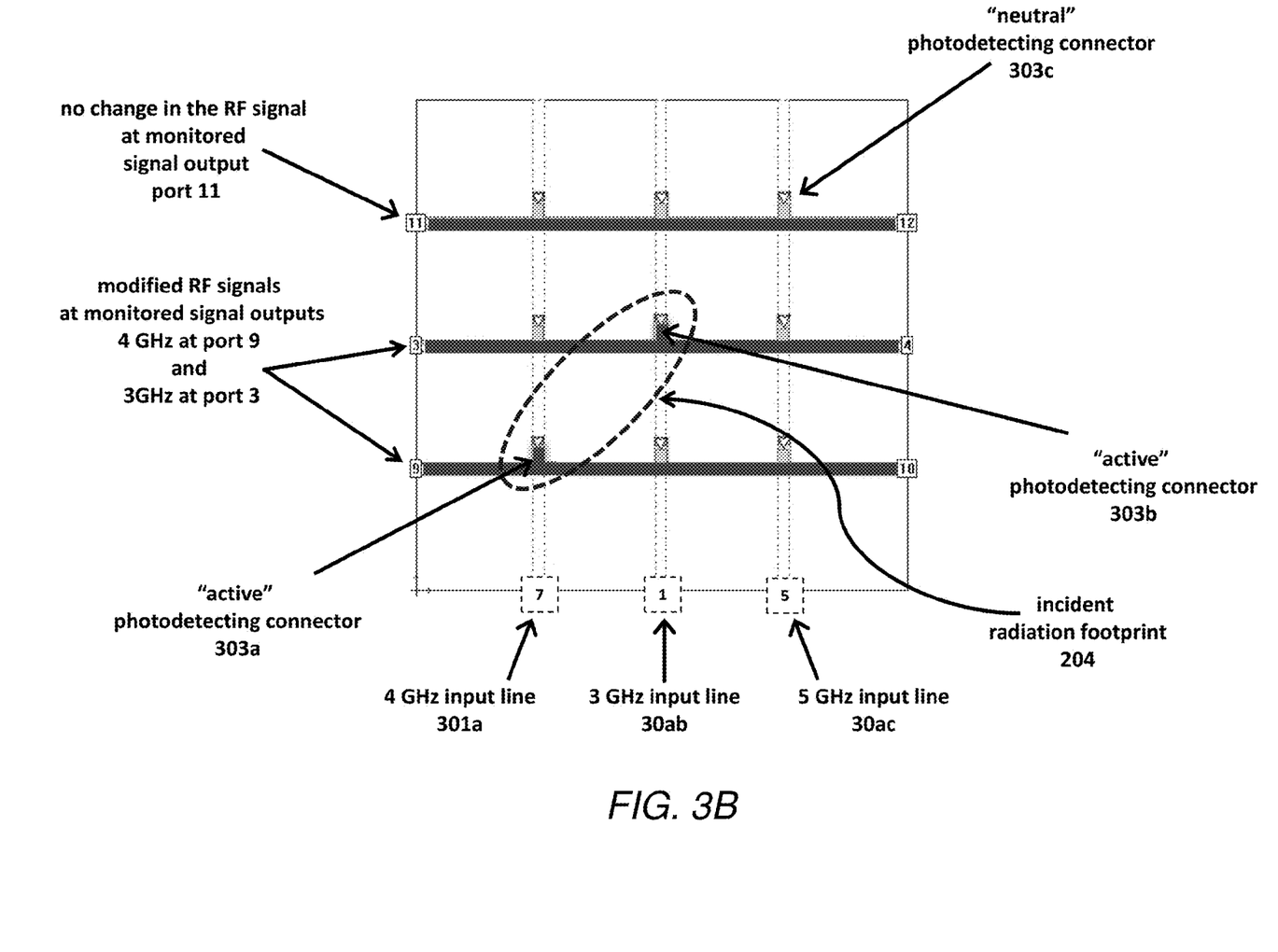

The block diagrams in FIGS. 3A and 3B illustrate a second exemplary embodiment of an apparatus for detecting electromagnetic radiation using optical switches in a radiofrequency network in accordance with the present invention, in which the input and output lines are arranged in a two-dimensional configuration such that they lie within a single layer rather than in separate layers as in the embodiment described above with respect to FIGS. 2A and 2B. Rather than being connected by photoconductive switches which operate in an "on-off" regime, the input and output lines in this two-dimensional configuration are connected by photodetecting connectors which modify the output of any given line when they are exposed to electromagnetic radiation.

Thus, as illustrated in FIGS. 3A and 3B, a second exemplary embodiment of an apparatus for detecting electromagnetic radiation in accordance with the present invention comprises a two-dimensional n×m array of RF transmission lines comprising n input transmission lines 301 and m output transmission lines 302 intersecting the input transmission lines, where the input and output transmission lines are connected at their intersections by a corresponding plurality of photodetecting connectors 303. As described above with respect to the three-dimensional configuration shown in FIGS. 2A and 2B, although FIGS. 3A and 3B show the input and output lines as being orthogonal, orthogonality is not required and any other intersecting configuration may be utilized.

In the two-dimensional embodiment illustrated in FIGS. 3A and 3B, in the absence of any incident radiation on a photodetecting connector 303, it remains in its "neutral" state, and as shown in FIG. 3A, the RF signal received at monitored signal output ports 9, 3, or 11 remains unchanged. However, as shown in FIG. 3B, when a portion of the structure is illuminated by electromagnetic radiation, photodetecting connectors 303a and 303b that lie within radiation footprint 304 switch to an "active" state, so that a magnitude and/or a phase of the RF signal output at ports 9 and 3, respectively, connected thereto is modified, photodetecting connector 303c, which lies outside radiation footprint 304, remains in its "neutral" state so that the signal output at port 11 remains unchanged.

By analyzing the change in the output signal using signal processing methods well known in the art, the location of the connectors exposed to the incident radiation can be easily and quickly determined. In addition, as with the three-dimensional configuration described above, by analyzing the extent and manner in which the output signal has been modified, such signal processing methods can also be used to identify the location, intensity and size of the radiation footprint in cases where multiple connectors are exposed.

The degree of the change in the measured RF output signal, e.g., the degree of the change in the signals' magnitude, is directly related to the intensity of the incident radiation.

The strength of the output signal measured at port 3 from the signal power transmitted at ports 1 and 7, respectively, can be found from the relations $$S31_{db} = \frac{\text{signal power (in dbm) received at Port 3}}{\text{signal power (in dbm) received at Port 1}}$$

$$S37_{db} = \frac{\text{signal power (in dbm) received at Port 3}}{\text{signal power (in dbm) received at Port 7}}$$

For a photoconductor or other optical detector that increases its conductivity in proportion to the strength of the incident electromagnetic radiation, the signal power received at the output port will also increase. Hence, given a constant RF signal input to the input port, an increase in received signal power increases the numeric value of $S31_{db}$ indicating a change in incident electromagnetic radiation strength.

Thus, in accordance with the present invention, not only can the location and type of radiation incident on a structure be determined by monitoring the frequency of the RF signals output from a grid of transmission lines connected by photoconductive optical switches as described herein, so also can the intensity of the incident radiation be determined by measuring the strength of the output signals.

EXAMPLE

The ability of the RF sensing network to determine the location of incident electromagnetic radiation was predicted using the SONNET® suite of high-frequency electromagnetic software, and proof of principle was confirmed with a test device.

In the modeled analysis described below, simulated radio signals having a frequency of 5 GHz and 6 GHz were input via input transmission lines at ports 1 and 7, respectively, and the structure was illuminated by electromagnetic radiation as described above.

Figure 4A:
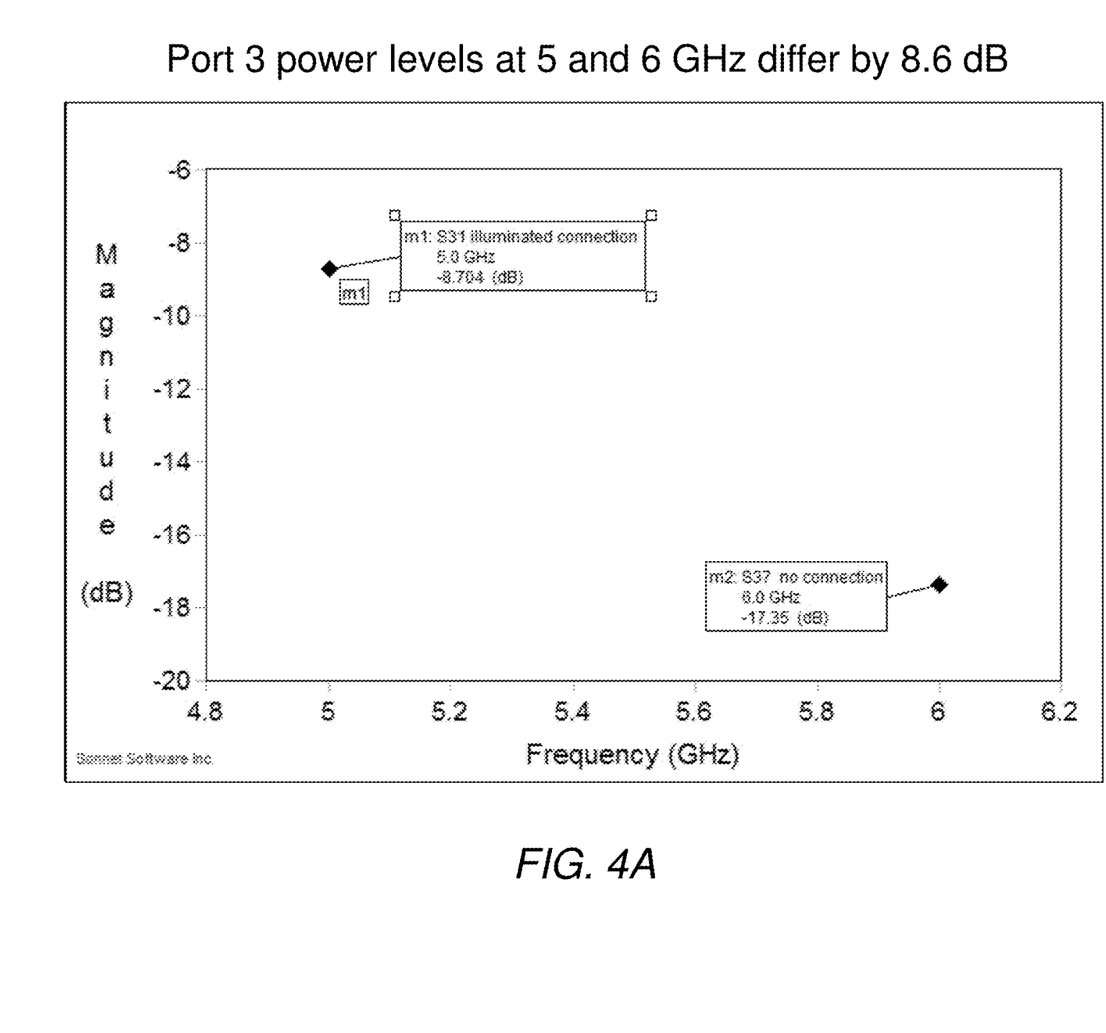
FIGS. 4A and 4B are plots illustrating the results of modeled testing of detection of electromagnetic radiation using photoconductive optical switches in an RF network in accordance with the present invention.
Figure 4B:
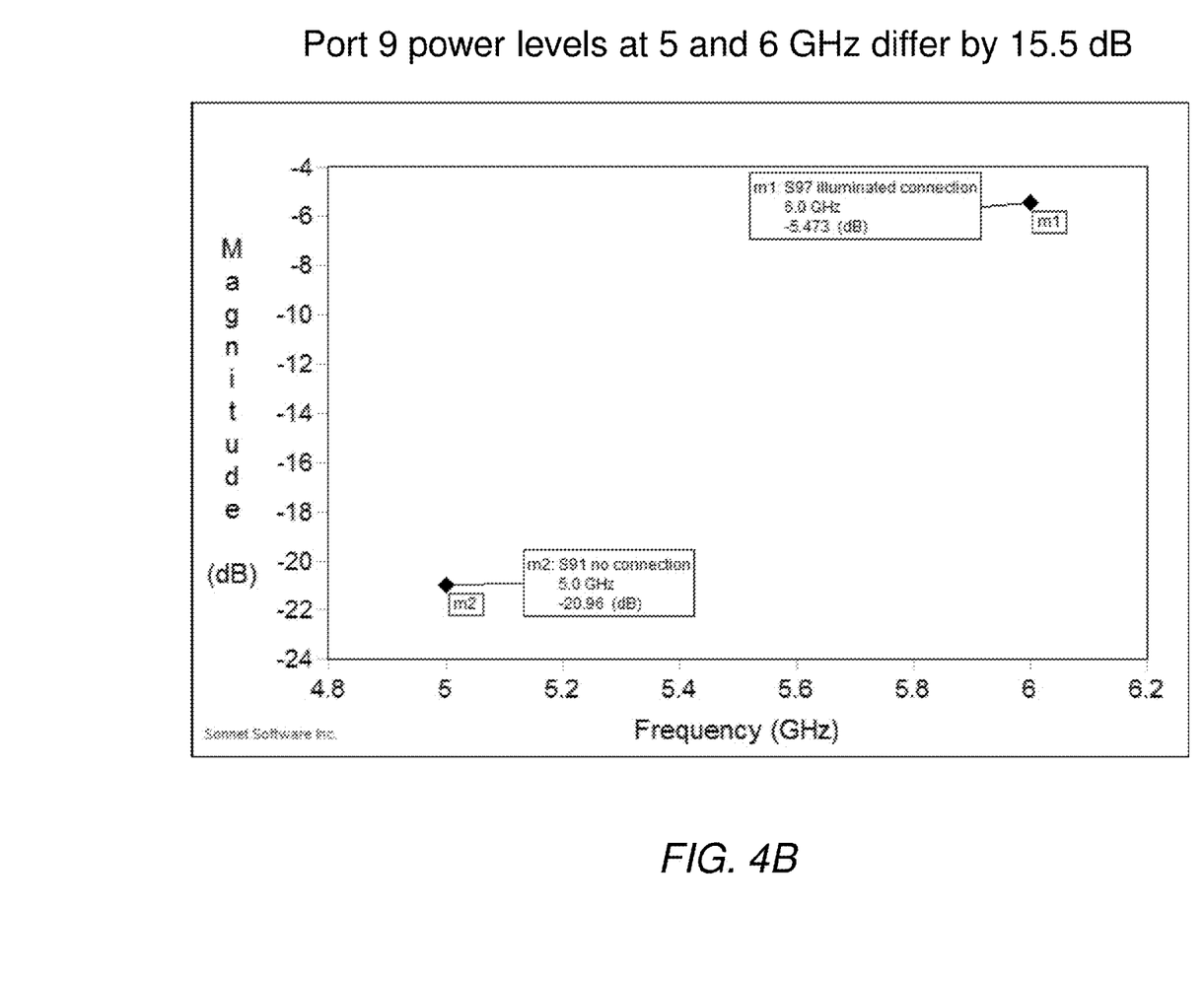

The results of this modeled testing are reflected in the plots shown in FIGS. 4A and 4B.

In the modeled testing reflected in the plot shown in FIG. 4A, only the connector between the input line connected to port 1 and the output line connected to port 3 is illuminated, while in the modeled testing reflected in the plot shown in FIG. 4B, only the connector between the input line connected to port 7 and the output line connected to port 9 was illuminated. Thus, in the modeled testing reflected in FIGS. 4A and 4B, only those connectors are in an active state, while the other, unilluminated, connectors, remain neutral.

As shown in FIG. 4A, for the 5 GHz RF signal input at transmission port 1, $S31_{db}$, the power ratio of the output signal measured at output port 3 to the 5 GHz input signal at input port 1 is −8.704 (dB). This is much higher than the $S37_{db}$ output power ratio of −17.35 (dB) measured at port 3 for the 6 GHz signal input at port 7, whose connection to output port 3 is not illuminated.

Similarly, as shown in FIG. 4B, in which only the connection between input port 7 and output port 9 is illuminated, $S97_{db}$, the power ratio of the output signal measured at output port 9 to the 6 GHz input signal at port 7 is −5.473 (dB), which is much higher than the $S91_{db}$ power ratio of −20.96 (dB) between the output signal at port 9 to the unconnected 5 GHz input signal at port 1.

Figure 5:
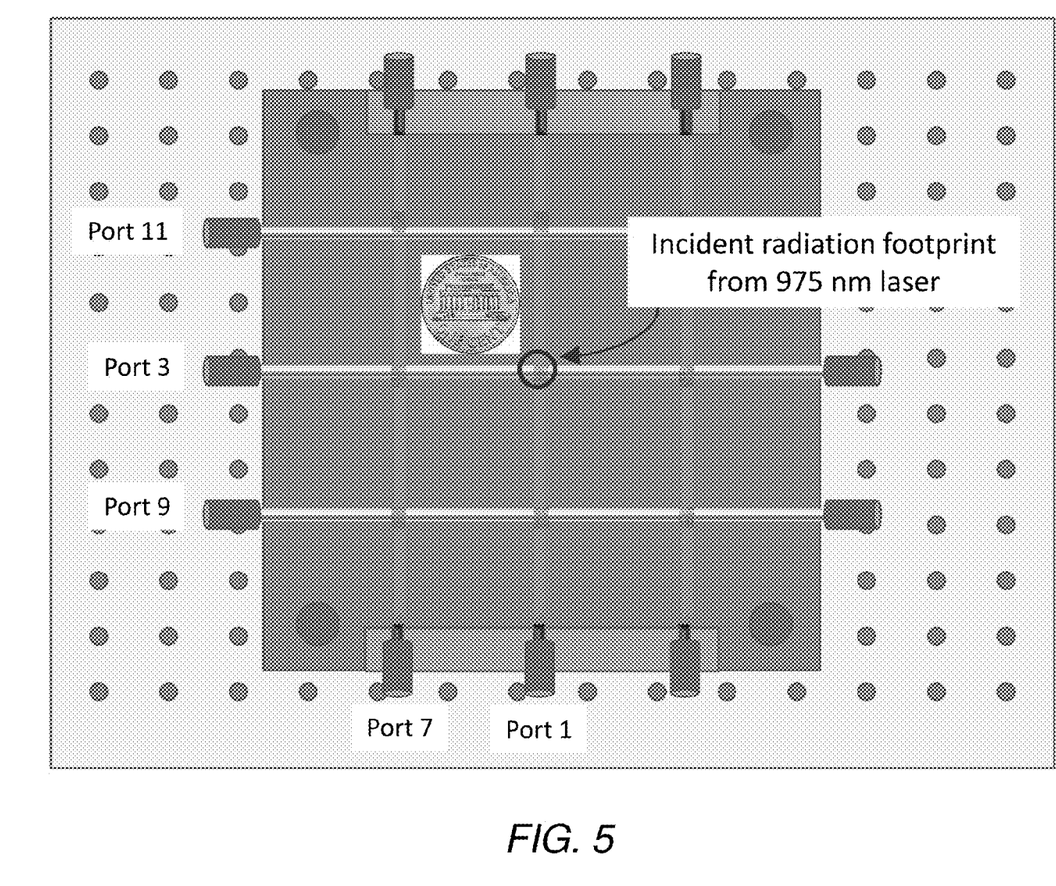
FIG. 5 is a block diagram depicting an exemplary embodiment of an apparatus for detecting electromagnetic radiation using photoconductive optical switches in an RF network in accordance with the present invention.

For proof of principle purposes, a three-dimensional switching network substantially in the form illustrated by the block diagram shown in FIG. 5 was designed and constructed on two layers of FR-4 laminate using phosphorous-doped silicon photoconductive connectors between the input and output lines. The operation of the structure was tested by applying an input RF signal and illuminating only one of the photoconductive connectors, with a 3 GHz RF signal being input to lower layer input port 1 and a 975 nm laser being used to illuminate the connector connecting input port 1 and upper layer output port 3. Upon illumination of the structure by the laser, there was a 4.9 dB increase in the 3 GHz signal at output port 3, indicating the possible presence of crosstalk but also an immediate unmistakable response of the switching network to the incident radiation at 975 nm.

Thus, it was shown that by using photoconductive connectors as optical switches between input and output transmission lines in an RF network, the presence and location of the exposure of an array of input and output lines to electromagnetic radiation can be quickly and accurately detected.

Advantages and New Features

The switching network embedded in a structure in accordance with the present invention is intended to act in a manner analogous to the nervous system of a human body as it responds to sensory input such as touch or temperature and then moves in response to that sensory input. Laser ranging is not required for a structure to respond to incident radiation using this approach. The entire structure can be sensitive to radiation and therefore sensing is not limited to one location.

The rapid response time of optical sensors to multiple wavelengths permits using these sensors as a method for detecting incident electromagnetic energy on structures.

As a result, the present invention can be used for real-time detection of the location and intensity of a laser beam footprint on a structure such as a building or a vehicle. This capability could be highly useful in, e.g., detection of laser radiation incident on aircraft cockpit windows.

In some embodiments, the invention can be implemented as an integral part of a vehicle such as an aircraft or a self-driving vehicle. By including an RF switching apparatus in accordance with the present invention as part of the "skin" of such a vehicle, the vehicle can sense the location and intensity of electromagnetic radiation incident thereon in real time and can use that information to adjust the vehicle trajectory.

Alternatives

In some embodiments, optical sensors such as photodiodes, phototransistors, and photovoltaic cells may be alternatives to photoconductors as optical switches. In other embodiments, organic optical sensors designed to operate at specific wavelengths would be a less brittle option than semiconductor based sensors.

Instead of metal RF transmission lines, materials such as carbon nanotubes (CNTs) that are lightweight and conductive could be embedded in the structure on multiple layers.

Another embodiment would use sensors and transmission lines fabricated on one sheet and inserted as a layer in the structure.

Other network characteristics in addition to changes in conductivity such as inductance or capacitance could be used to determine the location and intensity of the laser footprint.

Real-time signal processing could be used to coordinate more than one vehicle's response to the incident laser radiation.

Although particular embodiments, aspects, and features have been described and illustrated, it should be noted that the invention described herein is not limited to only those embodiments, aspects, and features, and it should be readily appreciated that modifications may be made by persons skilled in the art. The present application contemplates any and all modifications within the spirit and scope of the underlying invention described and claimed herein, and all such embodiments are within the scope and spirit of the present disclosure.

What is claimed is:

1. An apparatus for detecting an incidence of electromagnetic radiation on a structure, comprising:

a three-dimensional two-layer 2×n×m array of radiofrequency (RF) transmission lines situated within the structure, the array comprising n input lines in a first plane, each of the n input lines being configured to receive an input RF signal having a frequency $f_n$ unique to that line, and m output lines in a second plane, each of the m output lines being configured to receive and output an RF signal from at least one of the n input lines, a direction of at least one of the n input lines intersecting a direction of at least one of the m output lines, each pair of intersecting input and output lines being physically connected by a corresponding optical switch; and a processor configured to receive and process the output signals to identify a location of the incident electromagnetic radiation on the structure;

wherein when the structure is subjected to incident electromagnetic radiation having a wavelength within a specified range, an optical switch located within a footprint of the incident electromagnetic radiation on the structure becomes electrically active and completes an electrical connection between the input and output lines connected by the optical switch while an optical switch located outside the footprint of the electromagnetic radiation on the array remains inactive;

wherein an unconnected output line corresponding to an inactive optical switch does not output any signal while a connected output line corresponding to an active optical switch outputs a signal having a frequency of the RF signal input into the connected input line;
wherein a frequency of the output signal is indicative of a location of the incident electromagnetic radiation on the structure; and
further wherein a strength of the output signal is indicative of an intensity of the incident electromagnetic radiation on the structure.

2. The apparatus according to claim 1, wherein the optical switch comprises a photoconductive connector.

3. The apparatus according to claim 2, wherein the photoconductive connector is formed from phosphorous-doped silicon.

4. The apparatus according to claim 1, wherein the optical switch is a photodiode, a phototransistor, or a photovoltaic cell.

5. The apparatus according to claim 1, wherein at least one of the input and output lines are formed from metal.

6. The apparatus according to claim 1, wherein at least one of the input and output lines are formed from carbon nanotubes.

7. The apparatus according to claim 1, wherein the array comprises a plurality of optical switches having a plurality of wavelength sensitivities.

8. The apparatus according to claim 1, wherein the processor is configured to produce a visual map of the structure indicating a location of the incident electromagnetic radiation on the structure.

9. The apparatus according to claim 1, wherein the structure is a vehicle, the apparatus further comprising a processor configured to identify a trajectory of the electromagnetic radiation incident on the structure and a processor configured to alter a direction of the vehicle in response to at least one of the location and the trajectory of the electromagnetic radiation incident on the vehicle.

10. An apparatus for detecting an incidence of electromagnetic radiation on a structure, comprising:
a two-dimensional n×m array of radiofrequency (RF) transmission lines situated in a single layer within the structure, the array comprising n input lines, each of the n input lines being configured to receive an input RF signal having a frequency $f_n$ unique to that line, and m output lines, each of the m output lines being configured to receive and output an RF signal from at least one of the n input lines,
at least one of the n input lines intersecting a at least one of the m output lines,
each pair of intersecting input and output lines being physically connected by a corresponding photodetecting connector; and
a processor configured to receive and process the output signals to identify a location of the incident electromagnetic radiation on the structure;
wherein when the structure is subjected to incident electromagnetic radiation having a wavelength within a specified range, a photodetecting connector located within a footprint of the incident electromagnetic radiation on the structure becomes active while a photodetecting connector located outside the footprint of the electromagnetic radiation remains neutral;
wherein an output signal from an output line connected to an active photodetecting connector is modified while an output signal from an output line connected to a neutral photodetecting connector is not modified;
wherein a frequency, magnitude, or phase of the modified output signal is indicative of a location of the incident electromagnetic radiation on the structure; and
further wherein the frequency, magnitude, or phase of the output signal is indicative of an intensity of the incident electromagnetic radiation on the structure.

11. The apparatus according to claim 10, wherein the photodetecting connector is a photodiode, a phototransistor, or a photovoltaic cell.

12. The apparatus according to claim 10, wherein at least one of the input and output lines are formed from metal.

13. The apparatus according to claim 10, wherein at least one of the input and output lines are formed from carbon nanotubes.

14. The apparatus according to claim 10, wherein the array comprises a plurality of optical switches having a plurality of wavelength sensitivities.

15. The apparatus according to claim 10, wherein the processor is configured to produce a visual map of the structure indicating a location of the incident electromagnetic radiation on the structure.

16. The apparatus according to claim 10, wherein the structure is a vehicle, the apparatus further comprising a processor configured to identify a trajectory of the electromagnetic radiation incident on the structure and a processor configured to alter a direction of the vehicle in response to at least one of the location and the trajectory of the electromagnetic radiation incident on the vehicle.

17. A method for detecting an incidence of electromagnetic radiation on a structure, comprising:
providing a three-dimensional two-layer 2×n×m array of radiofrequency (RF) transmission lines situated within the structure, the array comprising n input lines in a first layer, each line being configured to receive an input RF signal having a frequency $f_n$ unique to that line, and m output lines in a second layer, the m output lines being configured to receive and output an RF signal from at least one of the n input lines,
a direction of at least one of the n input lines intersecting a direction of at least one of the m output lines,
each pair of intersecting input and output lines being physically connected by a corresponding optical switch; and
providing a processor configured to receive and process the output signals to identify a location of the incident electromagnetic radiation on the structure;
wherein when the structure is subjected to incident electromagnetic radiation having a wavelength within a specified range, an optical switch located within a footprint of the incident electromagnetic radiation on the structure becomes electrically active and completes an electrical connection between the input and output lines connected by the optical switch while an optical switch located outside the footprint of the electromagnetic radiation on the array remains inactive;
wherein an unconnected output line corresponding to an inactive optical switch does not output any signal while a connected output line corresponding to an active optical switch outputs a signal having a frequency of the RF signal input into the connected input line;
wherein a frequency of the output signal is indicative of a location of the electromagnetic radiation on the structure; and
further wherein a strength of the output signal is indicative of an intensity of the electromagnetic radiation on the structure.

18. A method for detecting an incidence of electromagnetic radiation on a structure, comprising:
providing a two-dimensional n×m array of radiofrequency (RF) transmission lines situated in a single layer within the structure, the array comprising n input lines, each of the n input lines being configured to receive an input RF signal having a frequency $f_n$ unique to that line, and m output lines, each of the m output lines being configured to receive and output an RF signal from at least one of the n input lines,
  at least one of the n input lines intersecting at least one of the m output lines, and
  each pair of intersecting input and output lines being physically connected by a corresponding photodetecting connector; and
providing a processor configured to receive and process the output signals to identify a location of the incident electromagnetic radiation on the structure;
wherein when the structure is subjected to incident electromagnetic radiation having a wavelength within a specified range, a photodetecting connector located within a footprint of the incident electromagnetic radiation on the structure becomes active while a photodetecting connector located outside the footprint of the electromagnetic radiation remains neutral;
wherein an output signal from an output line connected to an active photodetecting connector is modified while an output signal from an output line connected to a neutral photodetecting connector is not modified;
wherein a frequency, magnitude, or phase of the modified output signal is indicative of a location of the incident electromagnetic radiation on the structure; and
further wherein the frequency, magnitude, or phase of the output signal is indicative of an intensity of the incident electromagnetic radiation on the structure.

\* \* \* \* \*